M. C. NOLTE, DEC'D.
H. E. NOLTE, ADMINISTRATRIX.
CEMENT POST.
APPLICATION FILED JUNE 1, 1908.

949,594.

Patented Feb. 15, 1910.

Witnesses.
F. C. Dahlberg
A. G. Hague

Inventor.
M. C. Nolte.
by Orwig & Love Atty's

UNITED STATES PATENT OFFICE.

MARTIN C. NOLTE, OF LONG PINE, NEBRASKA; HARRIET E. NOLTE ADMINISTRATRIX OF SAID MARTIN C. NOLTE, DECEASED.

CEMENT POST.

949,594. Specification of Letters Patent. Patented Feb. 15, 1910.

Application filed June 1, 1908. Serial No. 435,894.

*To all whom it may concern:*

Be it known that I, MARTIN C. NOLTE, a citizen of the United States, residing at Long Pine, in the county of Brown and State of Nebraska, have invented a certain new and useful Cement Post, of which the following is a specification.

The object of my invention is to provide improved means for connecting fence wires with cement posts, which means are readily detachable from the post, so that they may be replaced or repaired quickly and easily, and at a minimum of expense.

My invention consists in the construction, arrangement and combination with a cement post having horizontal openings through it, of means for fastening fence wires to the posts, whereby the objects contemplated are attained, as hereinafter more fully set forth, pointed out in my claim, and illustrated in the accompanying drawings, in which—

Figure 1:
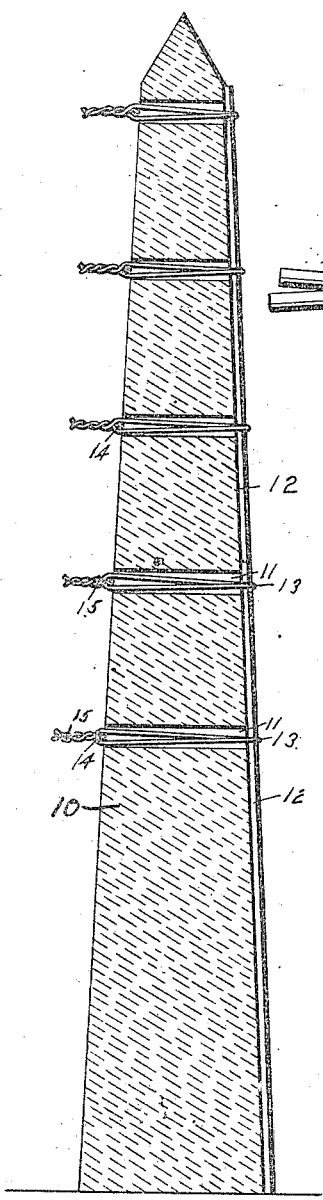
Figure 2:
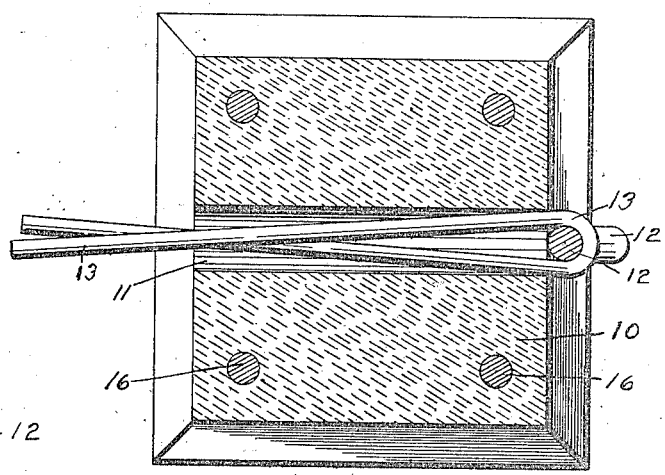
Figure 3:

Figure 1 shows a vertical, central sectional view of a cement post having openings extended horizontally through it, and my improved fence wire attaching device connected therewith, and fence wires supported thereby as in use. Fig. 2 shows a horizontal, sectional view in an enlarged scale through the post at one of the openings therein, and illustrating my improved fastening device in position, and Fig. 3 shows a detail view of the fence wire attaching device disconnected from the post.

Referring to the accompanying drawings, I have used the reference numeral 10 to indicate the cement post, which may be of any ordinary construction and shape, and which is provided with a series of horizontal openings therein, arranged at the places where fence wires are to be attached. At the back of the post I have arranged an upright rod 12, standing adjacent to the openings 11, and extended through each of the openings 11 is a doubled wire 13, passed around the rod 11, extended through the opening, and with its ends projected to points beyond the front or face of the post. I connect the fence wires with the wires 13, as follows: The fence wires shown in the drawings are indicated by the numeral 14, and are placed in position adjacent to the openings at the front of the post, then the ends of the wires 13 are passed around the fence wires, and 'ed at 15, thus securely holding the fence wires to the posts. In Fig. 2 of the drawings, I have shown reinforcing rods 16, in the corners of the posts.

In practical use, when the posts are manufactured, the openings 11 are formed therein at as many places as it may be desired to attach fence wires, then when erecting a fence, an upright rod 12 is placed adjacent to the rear of each post, and then the wires 13 are passed around the upright rod 12, and extended through the openings, and their free ends are twisted around the fence wires. In the event that any of the rods 12 or wires 13, should be broken, or should deteriorate by rusting, they may be easily and quickly replaced and the fence repaired without injury to the post.

Having thus described my invention, what I claim and desire to secure by Letters Patent of the United States therefor, is—

The combination with a fence post in the form of a solid body having a plurality of horizontal openings extending therethrough at intervals in its height and also having the wall of each of said openings continuous and unbroken between its opposite sides and the ends of each opening at said opposite sides; of an upright metallic rod arranged against one of the said sides of the post and intersecting the ends of all of the openings at that side, and exposed throughout its length, horizontal fence wires arranged against the opposite side of the post and each intersecting the opposite end of one of said openings, and a series of wires corresponding in number to the openings in the post; each of said series of wires, being bent into loop-formation considerably smaller transversely than its respective opening and extending loosely in such form through and movable endwise in the opening and beyond the said opposite sides of the post, and each having a vertically-disposed bight receiving the upright rod, and also having portions crossed within the opening, and end portions extending above and below one fence wire and twisted about each other beyond said fence wire, all as and for the purpose set forth.

Des Moines, Iowa, 3/28/07.

MARTIN C. NOLTE.

Witnesses:
F. N. AUSTIN,
A. L. AUSTIN.